United States Patent [19]

Peascoe

[11] Patent Number: 4,831,082

[45] Date of Patent: May 16, 1989

[54] IMPACT MODIFIED AROMATIC CARBONATE COMPOSITIONS

[75] Inventor: Warren J. Peascoe, Stockbridge, Mass.

[73] Assignee: General Electric Company, Pittsfield, Mass.

[21] Appl. No.: 112,261

[22] Filed: Oct. 22, 1987

Related U.S. Application Data

[63] Continuation-in-part of Ser. No. 937,253, Dec. 3, 1986, abandoned.

[51] Int. Cl.$^4$ ............................................. C08L 69/00
[52] U.S. Cl. ................................... 525/148; 525/146; 525/903
[58] Field of Search ............... 525/148, 903, 67, 146, 525/468

[56] References Cited

U.S. PATENT DOCUMENTS 3,944,631 3/1976 Yu et al. ........................ 525/243 X
4,148,842 4/1979 Yu et al. ........................ 525/67 X

FOREIGN PATENT DOCUMENTS 0186826 12/1985 European Pat. Off. .

*Primary Examiner*—Theodore E. Pertilla
*Attorney, Agent, or Firm*—Hedman, Gibson, Costigan & Hoare

[57] ABSTRACT

An aromatic carbonate resin composition substantially free of non-crosslinked or linear styrene-acrylonitrile resin exhibiting improved impact properties comprised of:

(i) at least one thermoplastic aromatic carbonate resin; and (ii) an amount effective to improve the impact properties of said resin of at least one interpolymer of a crosslinked polyacrylate and a crosslinked styrene-acrylonitrile resin. The interpolymer is a two phase interpolymer formed by a two stage polymerization process.

45 Claims, No Drawings

IMPACT MODIFIED AROMATIC CARBONATE COMPOSITIONS

This is a continuation-in-part application of application Ser. No. 937,253, filed Dec. 3, 1986, abandoned.

BACKGROUND OF THE INVENTION

Aromatic carbonate resins are well known thermoplatic materials which due to their many advantageous properties find use as thermoplastic engineering materials. The aromatic carbonate resins exhibit, for example, excellent properties of toughness, flexibility, and thermal stability, particularly thermal dimensional stability. The aromatic carbonate resins and methods for their preparation are disclosed, inter alia, in U.S. Pat. Nos. 2,964,974, 2,999,835, 3,169,121, 3,028,365, 3,334,154, 3,275,601 and 3,915,926.

However, the impact properties, particularly impact strength, of these aromatic carbonate resins are generally not sufficiently high for certain applications. This is particularly true of their thick section, i.e., one-quarter inch and thicker, impact strength.

It is known that the impact properties of polycarbonates can be upgraded by combining the polycarbonate resins with impact modifiers. U.S. Pat. No. 4,148,842 of Yu et al. discloses blends of a polycarbonate resin and an interpolymer modifier comprising crosslinked (meth-)acrylate, crosslinked styrene-acrylonitrile, and uncrosslinked styrene acrylonitrile. This impact modifier is described in U.S. Pat. No. 3,944,631 of Yu et al. as being a three-stage impact modifier produced in a three-stage polymerization procedure in which in the third stage, a crosslinked acrylate/crosslinked styrene-acrylonitrile polymeric material is used as a reaction ingredient during the polymerization of styrene and acrylonitrile without a crosslinking agent.

It has now been discovered that a two-phase material, i.e., a crosslinked acrylate/crosslinked styreneacrylonitrile, produced by a two-stage polymerization procedure, can be utilized as an effective impact modifier for thermoplastic aromatic carbonate resins such as polycarbonates and copolyester-carbonates. The use of this two-phase interpolymer comprised of a crosslinked elastomeric acrylate and a crosslinked styrene-acryloni- trile is tuus a departure from known techniques described in the prior art. For example, in the aforesaid U.S. Pat. No. 3,944,631 and 4,148,842 a three-stage polymerizations yielding a three-phase interpolymer comprised of a crosslinked acrylate/crosslinked styrene-acrylonitrile/uncrosslinked or linear stryene-acrylonitrile are advocated, rather than a two-stage polymerization yielding a two-phase interpolymer followed by a blending step, as discussed herein.

The fact that the two-phase crosslinked acrylate/-crosslinked styrene-acrylonitrile interpolymer can be used effectively in aromatic carbonate resins as an impact modifier is generally surprising and unexpected. In order for a material to function as an effective impact modifier for aromatic carbonate resins it must not only improve the impact properties of the resins but must also be compatible with the aromatic carbonate resins, that is, it must not deleteriously affect the advantageous properties of the resins. Furthermore, it must be readily combinable with aromatic carbonate resins over the range of concentrations which are effective to improve the impact properties of the resins. While some materials act to improve the impact properties of aromatic carbonate resins, they do so only at the cost of deleteriously affecting some of the other advantageous properties of the resins. While other materials function as impact modifiers for aromatic carbonate resins and do not significantly deleteriously affect substantially most of the other advantageous properties of these resins, they are not readily combinable with the aromatic carbonate resins. Still other materials need to be present in relatively large concentrations in order to significantly upgrade the impact properties of aromatic carbonate resins. The area of improving the impact properties of aromatic carbonate resins by blending them with various impact modifiers is thus still an art wherein the empirical approach is still generally the rule.

Thus, the fact that the instant two-phase cross-linked interpolymers function as effective impact modifiers for aromatic carbonate resins, in that they positively upgrade the imact properties of aromatic carbonate resins at relatively low loadings, are compatible with these resins, and are readily combinable with aromatic carbonate resins, could not have been predicted and is unexpected.

FIELD OF THE INVENTION

The instant invention relates to aromatic carbonate resin compositions exhibiting improved impact properties. More particularly, the instant invention relates to aromatic carbonate resin compositions exhibiting improved impact properties comprised of an aromatic carbonate resin and an impact modifier comprised of a two-phase interpolymer of a crosslinked polyacrylate/-crosslinked styrene-acrylonitrile resin.

SUMMARY OF THE INVENTION

Thermoplastic aromatic carbonate resin compositions exhibiting improved impact properties are provided by combining a thermoplastic aromatic carbonate resin with an effective amount of an impact modifier which is a two-phase interpolymer comprised of a first elastomeric phase of a crosslinked polyacrylate and a second phase comprised of a crosslinked styrene-acrylonitrile. The two phases are joined together by an interpenetrating network of the crosslinked resins with minimal or no grafting therebetween. This two-phase interpolymer is substantially free of uncrosslinked styrene-acrylonitrile resin.

DETAILED DESCRIPTION OF THE INVENTION

The instant compositions are comprised of blends of at least one thermoplastic aromatic carbonate resin and an amount effective to positively upgrade the impact properties, e.g., impact strength, of said resin of a two-phase interpolymer comprised of crosslinked polyacrylate/crosslinked styrene-acrylonitrile forming an itterpenetating network between the two phases.

The aromatic carbonate resins of the instant invention include the polycarbonate resins and the copolyester-carbonate resins. The polycarbonate resins are conventional, well known materials which are generally commercially available or may be readily prepared by known methods. These polycarbonates, as well as methods for their preparation, are described, inter alia, in U.S. Pat. Nos. 3,161,615, 3,220,973, 3,312,659, 3,312,660, 3,313,777, 3,666,614 and 3,393,672, all of which are incorporated herein by reference. The polycarbonates may be prepared by a variety of known methods, including the interfacial polymerization process which involves the coreaction of at least one dihydric phenol and a carbonate precursor. The polycarbonate resins contain at least one recurring structural unit represented by the general formula

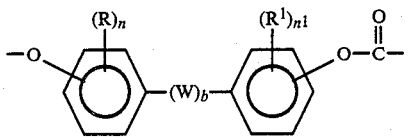

wherein:
R and $R^1$ are independently selected from monovalent hydrocarbon radicals, monovalent hydrocarbonoxy radicals, and halogen radicals;
W is selected from divalent hydrocarbon radicals,

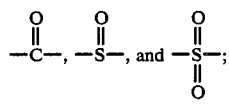

n and $n^1$ are independently selected from integers having a value of from 0 to 4, inclusive;
and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The monovalent hydrocarbonoxy radicals represented by R and $R^1$ may be represented by the formula $-OR^2$ wherein $R^2$ is a monovalent hydrocarbon radical of the type described hereinabove. Preferred hydrocarbonoxy radicals are the alkoxy and aryloxy radicals.

The divalent hydrocarbon radicals represented by W include alkylene, alkylidene, cycloalkylene, and cycloalkylidene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 6 to about 16 ring carbon atoms.

Typically, the dihydric phenols utilized in the preparation of the polycarbonate resins may be represented by the formula

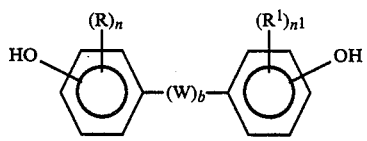

wherein R, $R^1$, n, $n^1$, W and b are as defined above.

Some illustrative non-limiting examples of dihydric phenols falling within the scope of Formula II include: 2,2-bis(4-hydroxyphenyl)propane (bisphenol-A); 2,2-bis(3,5-dibromo-4-hydroxyphenyl)propane; 2,2-bis(3,5-dimethyl-4-hydroxyphenyl)propane; 2,2-bis(3-bromo-5-methyl-4-hydroxyphenyl)propane; 1,1-bis(4-hydroxyphenyl)cyclohexane; 1,1-bis(4-hydroxyphenyl)cyclododecane; 1,1-bis(3,5-dimethyl-4-hydroxyphenyl)cyclododecane; 1,1-bis(4-hydroxyphenyl)decane; 1,4-bis(4-hydroxyphenyl)butane; bis(4-hydroxyphenyl)methane; 4,4'-thiodiphenol; and bis(4-hydroxyphenyl)ether.

Other dihydric phenols which are useful are described in U.S. Pat. Nos. 2,998,835, 3,028,365 and 3,334,154, all of which are incorporated herein by reference.

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(halophenyl)carbonates such as di(bromophenyl)carbonate, di(chlorophenyl)carbonate, and di(tribromophenyl)carbonate; di(alkylphenyl)carbonates such as di(tolyl)carbonate; di(naphthyl)carbonate; chlorophenyl chloronaphthyl carbonate; and phenyl tolyl carbonate. The bishaloformates that can be used include bishaloformates of dihydric phenols such as the bischloroformates of bisphenol-A and hydroquinone; and the bishaloformates of glycols such as the bischloroformates of ethylene glycol, neopentyl glycol, and polyethylene glycol. The preferred carbonate precursor is carbonyl chloride, also known as phosgene.

Among the processes used for the preparation of the polycarbonates are the pyridine process, the interfacial polymerization process, transesterification, and melt polymerization. A convenient process for the preparation of the polycarbonate resins is the interfacial polymerization process. This process utilizes two different solvent media which are immiscible. One solvent medium is an aqueous basic medium. The other solvent medium is an organic medium such as methylene chloride which is immiscible with said aqueous medium. Also employed in the interfacial polymerization process are molecular weight regulators which control the chain length or molecular weight of the polycarbonate by a chain terminating mechanism, and catalysts. The molecular weight regulators are well known in the art and include, but are not limited to, phenol itself, p-tertiarylbutyl phenol, and chroman-I. The catalysts are also well known in the art and include, but are not limited to, tertiary amines such as triethylamine, quaternary ammonium compounds such as tetraethylammonium bromide, and quaternary phosphonium compounds such as n-butyltriphenyl phosphonium.

Also included within the scope of the term polycarbonates are the randomly branched thermoplastic polycarbonates wherein a branching agents, which is generally a polyfunctional aromatic compound, is reacted with the dihydric phenol and the carbonate precursor. These polyfunctional aromatic compounds are used in minor amounts, i.e., amounts effective to provide branching, and contain at least three functional groups which may be carboxyl, hydroxyl, carboxylic anhydride, haloformyl, and mixtures thereof. Some illustrative nonlimiting examples of these aromatic polyfunctional compounds which may be employed as branching agents include trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

The copolyester-carbonate resins useful in the present invention are well known in the art and are described along with methods for their prepartion in U.S. Pat.

Nos. 3,169,121, 4,238,596, 4,156,069 and 4,238,597, all of which are incorporated herein by reference.

Briefly stated, the high molecular weight thermoplastic aromatic copolyester-carbonates comprise recurring carbonate groups, carboxylate groups, and aromatic carbocylic groups in the polymer chain in which at least some of the carbonate groups and at least some of the carboxylate groups are bonded directly to the ring carbon atoms of the aromatic carbocylic groups. These copolyester-carbonates contain ester bonds and carbonate bonds in the chain, wherein the amount of the ester bonds is in the range of from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

These copolyester-carbonates may be readily prepared by the interfacial polymerization process by the reaction of (i) at least one dihydric phenol, (ii) a carbonate precursor, and (iii) an ester precursor. The dihydric phenols and the carbonate precursors are of the type described hereinabove. The ester precursor may be a difunctional carboxylic acid, or preferably, its ester-forming reactive derivative such as an acid dihalide, e.g., isophthaloyl dichloride, terephthaloyl dichloride, and mixtures thereof. Some useful difunctional acids are set forth in U.S. Pat. No. 3,169,121, incorporated herein by reference.

The impact modifier of the present invention is a two-phase interpolymer containing a first elastomeric phase comprised of a crosslinked poly(meth)acrylate and a second phase comprised of a crosslinked styrene-acrylonitrile resin. The two phases are joined and held together, in general, by an interpenetrating network of the crosslinked polyacrylate and the crosslinked styrene-acrylonitrile resin. The integrity of these two phases is generally maintained by the interpenetration and entanglement of the two crosslinked polymeric components rather than by chemical means such as grafting or graftlinking. Thus, the instant two-phase interpolymer is substantially free or contains little if any grafting or graftlinking between the two phases.

The instant two-phase interpolymer is also free or substantially free of non-crosslinked or linear styrene-acrylonitrile resin. That is to say, the instant interpolymer does not contain any added linear or non-crosslinked styrene-acrylonitrile resin. There is the possibility, in some cases, that very minor amounts of linear or non-crosslinked styrene-acrylonitrile resin may be present due to an incomplete crosslinking reaction. However, in such cases this non-crosslinked styrene-acrylonitrile is present in very minor amounts and as an impurity inherent in the crosslinking process, and not as an intentionally added and essential third phase. This is in sharp contrast to the three-phase interpolymer described in U.S. Pat. No. 3,944,631 which contains, as the third phase, a non-crosslinked or linear styrene-acrylonitrile resin. The first two phases of this three-phaseiinterpolymer are a crosslinked polyacrylate and a crosslinked styrene-acrylonitrile resin, respectively.

The instant two-phase interpolymer may be considered as having a structure wherein the first elastomeric crosslinked polyacrylate phase and the second crosslinked styrene-acrylonitrile phase are joined and held together by means of an interpenetrating network. This interpenetrating network through which the integrity of the two phases is manntained is formed when the monomers forming the second crosslinked styrene-acrylonitrile phase are polymerized and crosslinked in the presence of the previously polymerized and crosslinked first phase comprised of a crosslinked polyacrylate resin.

As mentioned previously, the instant two-phase interpolymer is thus free or substantially free of any grafting or graftlinking between these two phases and is also free or substantially free of any non-crosslinked or linear styrene-acrylonitrile resin.

These interpolymer compositions may be generally formed by the following type of two-step sequential polyme process:

1. emulsion polymerizing a (meth)acrylate monomer charge (herein designated "acrylate" for the purposes of the present invention) of at least one $C_2$-$C_{10}$ alkyl acrylate, or $C_8$-$C_{22}$ alkyl methacrylate, or compatible mixtures thereof, in an aqueous polymerization medium in the presence of an effective amount, e.g., from about 0.05 to about 10 percent by weight, of a di- or poly-functional ethylenically unsaturated crosslinking agent for such types of monomers to form an aqueous latex of crosslinked acrylic elastomeric particles;

2. emulsion polymerizing a charge of styrene and acrylonitrile monomers in an aqueous polymerization medium, also in the presence of an effective amount of a suitable di- or poly-functional ethylenically unsaturated crosslinking agent, said polymerization being carried out in the presence of the product of step 1 so that the crosslinked acrylic resin and the crosslinked styrene-acrylonitrile components form an interpolymer wherein the respective phases interpenetrate.

Such a two-stage polymerization process is analogous to the three-stage process described in U.S. Pat. No. 3,944,631 to Yu et al., incorporated herein by reference, except for the fact that this two-stage process does not include the critical third stage taught by Yu et al., which involves adding a monomeric charge of styrene and acrylonitrile which does not contain a cross-linking agent, to form a linear non-crosslinked styrene-acrylonitrile polymer. In other respects steps 1 and 2 are the same as described in U.S. Pat. No. 3,944,631.

The acrylic elastomers used in preparing the interpolymer of the instant invention comprise crosslinked acrylic polymers or copolymers having a Tg, i.e., a glass transition temperature, of below about 25° C. which can be polymerized by means of free radical-initiated emulsion techniques.

The acrylic elastomers are crosslinked during the polymerization of the elastomer by the inclusion of a di- or poly-functional ethylenically unsaturated monomer crosslinking agent, such as divinyl benzene, butylene glycol diacrylate, etc., in the polymerization mixture. The amount of ethylenically unsaturated crosslinking agent employed in each emulsion polymerization step may be varied over a wide range, e.g., from about 0.05 to about 10 percent by weight based on the monomer(s), but typically for economic reasons the lowest llevel of crosslinking agent yielding an impact-modifying interpolymer (i.e., preferably about 0.05 to 0.34 weight percent) will be used. Normally, the amount of crosslinker will be selected to obtain a good balance of properties, including compatibility, processability or ease of handling and mixing, combined with enhanced impact properties when added to thermoplastics. It has been surprisingly observed, however, that use of excess crosslinker in at least the acrylate phase of the two-phase interpolymer leads to additional improvements in impact strength of the final thermoplastic polycarbonate composition, especially in terms of knit line strength. Accordingly, special mention is made of embodiments according to this invention wherein at least the acrylate phase of the two-phase interpolymer impact modifier is highly crosslinked. The term "highly crosslinked" is used above and hereinafter to distinguish from two-pase interpolymer compositions which are "normally" crosslinked, i.e., which are prepared using the minimum levels of crosslinking agent to obtain the aforementioned balance of properties, or to yield an interpolymer which is an effective impact modifier. Highly crosslinked two-phase interpolymer impact modifiers according to this embodiment of the present invention are characterized by a significant (i.e., over 10%) increase in knit line strength, without significantly affecting IZOD impact values. Highly crosslinked two-phase interpolymers may also show a reduced swelling index.

The precise amounts of excess crosslinking agent required to produce a highly crosslinked interpolymer is difficult to determine, primarily because differing amounts of different crosslinking agents will be effective to produce a highly crosslinked product. However, the most preferred impact modifiers according to the present invention, when added to thermoplastic polycarbonate at a level of about 5 weight percent (based on the polycarbonate), will produce compositions having a knit line strength of at least about 25. Most preferably, such highly crosslinked embodiments will be made using interpolymers wherein the acrylate phase and/or the styrene-acrylonitrile phase are prepared in the presence of about 0.4 to about 10 percent by weight (based on the weight of the monomers) of the ethylenically unsaturated crosslinking agent.

The preferred acrylate monomers are the $C_4$–$C_8$ alkyl acrylate monomers such as n-butyl acrylate, ethyl acrylate, and 2-ethylhexyl acrylate. If desired, the monomer charge may contain small amounts, i.e., 1–20 percent by weight of the amount of acrylate monomer, of optional monomers such as styrene, acrylonitrile, methacrylonitrile, methyl methacrylate, methacrylic acid, acrylic acid, vinylidene chloride, vinyl toluene and any other ethylenically unsaturated monomer copolymerizable with the acrylate monomer selected for use.

It is to be understood that the term "acrylate" and "acrylic" as used herein includes both the acrylates, i.e., alkyl acrylates, and methacrylates, i.e., alkyl methacrylates.

The interpolymer of the present invention generally comprises from about 40 to about 90 percent by weight of at least one of the crosslinked acrylates, and from about 10 to about 60 percent by weight of said crosslinked styrene-acrylonitrile. Preferably the interpolymer will comprise from about 550 to about 80 weight percent of said crosslinked acrylate and from about 20 to about 50 weight percent of said crosslinked styrene-acrylonitrile. Weight percent is calculated based on the total amounts of said crosslinked poly(meth)acrylate resin and said crosslinked styrene-acrylonitrile resin present in the interpolymer.

In contradistinction to the three-phase interpolymer described in U.S. Pat. No. 3,944,961, the instant two-phase interpolymer does not contain, as discussed hereinabove, any added non-crosslinked styrene-acrylonitrile copolymer which is obtained by the polymerization of styrene and acrylonitrile monomers in the absence of a crosslinking agent. The phrase "free or substantially free" of any non-crosslinked or linear styrene-acrylonitrile thus means that the instant compositions do not intentionally contain any non-crosslinked styrene-acrylonitrile as a third phase or component of the instant two-phase interpolymer. Any non-crosslinked styrene-acrylonitrile present in very minor amounts as an impurity resulting from any incomplete crosslinking in the crosslinking reaction of this second phase.

The amount of the instant two-phase impact modifier present in the instant compositions is an amount which is effective to improve, i.e., positively upgrade, the impact properties, particularly the impact strength, of the instant aromatic carbonate resins. Generally, this amount is from about 1 to about 30 weight percent, preferably from about 3 to about 25 weight percent, and more preferably from about 4 to about 15 weight percent. Weight percent of impact modifier is calculated based on the total amounts of impact modifier and aromatic carbonate resin present in the compositions.

Generally, if less than about 1 weight percent of impact modifier is contained in the instant compositions there will be no appreciable improvement in the impact properties of the aromatic carbonate resin. In general, if the instant compositions contain in excess of about 30 weight percent of said impact modifier then some of the advantageous mechanical and physical properties of the aromatic carbonate resin will be significantly adversely affected, i.e., the composition will begin to loose some of the advantageous physical properties imparted thereto by the aromatic carbonate resins. Thus, the instant compositions contain an amount of impact modifier effective to improve the impact properties of said resin but insufficient to significantly adversely affect, to a substantial degree, substantially most of the advantageous properties of the aromatic carbonate resin.

The aromatic carbonate resin and the impact modifier may be admixed or the instant compositions compounded by any of the known conventional means. Thus, for example, the carbonate resin and the impact modifier can be physically admixed to form a mixture and the mixture can then be extruded. Alternatively, the two components can be fed to an extruder simultaneously.

The compositions of the instant invention may also optionally contain other commonly known and used additives for aromatic carbonate resins. These include antioxidants; impact modifiers other than those described herein which are used in conjunction with the instant impact modifiers; mold release agents; ultraviolet radiation stabilizers or absorbers; hydrolytic stabilizers such as the epoxides disclosed in U.S. Pat. Nos. 3,489,716, 4,138,379 and 3,839,247; color stabilizers such as the organophosphites disclosed in U.S. Pat. Nos. 3,305,520 and 4,118,370; and flame retardants. Some useful flame retardants are the alkali and alkaline earth metal salts described, inter alia, in U.S. Pat. Nos. 3,933,734, 3,948,851, 3,926,908, 3,919,167, 3,909,490, 4,953,396, 3,931,100, 3,978,024, 3,953,399, 3,917,559, 3,951,910 and 3,940,366, all of which are incorporated herein by reference.

The following examples are set forth to more fully and clearly illustrate the present invention. The examples are intended to be considered as illustrative and are not intended to limit the invention. In the examples all parts and percentages are on a weight basis unless otherwise indicated.

The following example illustrates the preparation of the two-phase crosslinked acrylate/crosslinked styrene-acrylonitrile interpolymer of the instant invention.

EXAMPLE 1

A 7,500 liter stainless steel reactor was charged with 5,488 liters of deionized water. With the agitator set at 55 rpm, the following ingredients were charged in order of their listing:

| Ingredients | Amount |
| --- | --- |
| Sodium lauryl sulfate emulsifier solution (30 wt. % active) | 15.77 kg. |
| Disodium monodecyl sulfosuccinate emulsifier solution (50 wt. % active) | 31.81 kg. |
| Sodium bisulfite buffer in deionized water | 2.09 kg. 6.1 liters |
| N—butyl acrylate monomer premixed with Butylene glycol diacrylate crosslinker | 1,112 kg. 1.89 kg. |

The reactor was purged of air by alternately pressuring the reactor to 0.703 kg/cm$^2$ with nitrogen and then venting to 0.141 kg/cm$^2$. This purge cycle was repeated three times. The reactor was heated to 54.4° C. At this point 2.09 kg of ammonium persulfate in 6.1 liters of deionized water were added. The batch temperature was held close to 54.4° C. by an automatic temperature control system supplying cooling to the reactor jacket. The batch was allowed to react for 2 hours. During the peak reaction rate the batch temperature rose briefly to 56.7° C. in spite of jacket cooling.

At the end of the 2 hour reaction time the following ingredients were charged:

| Ingredients | Amount |
| --- | --- |
| N—butyl acrylate monomer premixed with Butylene glycol diacrylate crosslinker | 4,458 kg. 7.58 kg. |
| Ammonium persulfate initiator in deionized water | 5.70 kg. 11.4 liters |
| Sodium bisulfate buffer in deionized water | 2.25 kg. 3.8 liters |

The reactor was then purged by alternately pressuring to 0.703 kg/cm$^2$ with nitrogen and venting to 0.141 kg/cm$^2$ three times. The batch was allowed to react for an additional 3.25 hours with the temperature control system set at 54.4° C. During the peak reaction rate the batch temperature rose momentaily to 68° C. in spite of the jacket cooling.

At the end of the 3.25 hour reaction time the following premixed solution was charged into the reactor with the agitator turned off:

| Ingredients | Amount |
| --- | --- |
| Sytrene monomer | 1,357 kg. |
| Acrylonitrile monomer | 500 kg. |
| Divinyl benzene (55 wt. % active) | 19.63 kg. |

After charging the above solution agitation was resumed at 55 rpm. The batch was allowed to react for 3.3 hours at 54.4° C.

At the end of the 3.5 hour reaction period, 1.5 kg of ascorbic acid in 11.4 liters of deionized water were added. The batch was then cooled and transferred through a strainer.

To the strained material there was added methanol (equal parts by weight of methanol) and 0.5 wt. % of calcium chloride. The resultant coagulum was filtered, washed with water, and dried in a vacuum oven.

The following example illustrates a composition falling outside the scope of the present invention. This example is presented for comparative purposes only.

EXAMPLE 2

To 100 parts by weight of an aromatic polycarbonate resin (derived from bisphenol-A and phosgene—LEXAN ® resin, grade 141, sold by the General Electric Company) there are added 0.05 part by weight of a first organopoosphite color stabilizer (Ultranox 626 marketed by Argus Chemical Corp.), 0.025 part by weight of a second organophosphite color stabilizer (Weston 618 marketed by Borg-Warner Chemical Co.), 0.1 part by weight of a first hindered thermal stabilizer (Irganox 1076 marketed by Ciba-Geigy Corp.), and 0.025 part by weight of a second hindered phenol thermal stabilizer (Irganox 1010 marketed by the Ciba-Geigy Corp.) The resultant mixture is extruded on a single screw extruder and molded into sample parts of ⅛" and ¼" thickness. These test samples are subjected to the notched Izod impact strength test performed in accordance with ASTM D-256. The ⅛" thick samples exhibited a notched Izod impact strength of 15.4 ft-lb/in while the ¼" thick samples exhibited a notched Izod impact strength of 2.2 ft-lb/in.

The following example illustrates a composition of the instant invention.

EXAMPLE 3

To 100 parts by weight of an aromatic polycarbonate resin of the type of Example 2 there are added 5 parts by weight of the two-phase interpolymer prepared substantially in accordance with the procedure of Example 1, 0.05 part by weight of an organophosphite color stabilizer (Ultranox 626), and 0.1 part by weight of a hindered phenol thermal stabilizer (Irganox 1076). The resultant mixture is extruded on a single screw extruder and molded into sample parts of ⅛" and ¼" thickness. These samples are subjected to the notched Izod impact strength test. The ⅛" samples exhibited a notched Izod impact strength of 14.7 ft-lb/in while the ¼" samples exhibited a notched Izod impact strength of 13.4 ft-lb/in.

As illustrated by the data in Examples 2 and 3, the instant compositions exhibit a much improved impact strength in thick sections, i.e., ¼" thickness. This is quite important for polycarbonate resins as they suffer from low critical thickness values, i.e., the thickness at which a discontinuity in Izod impact values occurs. These low critical thickness values tend to limit wall thickness of molded articles to a thickness below the critical thickness. The polycarbonates thus exhibit notched Izod impact values which are dependent on the thickness of the resin article. Thus, for example, as illustrated by the data in Example 2, while typical notched Izod impact values of ⅛" thick polycarbonate test specimens are generally in the neighborhood of about 15 ft-lb/in., typical notched Izod impact values for a ¼" thick polycarbonate test specimen are generally in the range of about 2 ft-lb/in. The relatively high Izod values of ⅛" thick polycarbonate test specimens are due to the fact that these specimens are thinner than the critical thickness of the polymer and, therefore, upon impact a hinged or ductile break occurs. The low Izod impact values of the ¼" thick polycarbonate test specimens are due to the fact that these specimens exceed the critical thickness of the polymer and, therefore, upon impact a clean or brittle break occurs.

The present compositions allow polycarbonate articles having thick wall sections exhibiting good impact strengths to be prepared, e.g., molded articles having a thickness exceeding ¼".

EXAMPLE 4

The effect of using excess crosslinker in the acrylate and styrene-acrylonitrile (SAN) phases of the impact modifier of the invention was examined. Impact modifier compositions were prepared as follows:

Sample A ("normally crosslinked"): 0.17 wt. % cross-linker in acrylate phase and 1.0 wt. % cross-linker in SAN phase;

Sample B ("highly crosslinked"): 0.68 wt. % crosslinker in arcylate phase, 1.0 wt. % in SAN phase;

Sample C ("highly crosslinked"): 0.17 wt. % crosslinker in acrylate phase, 4.0 wt. % in SAN phase;

Sample D ("highly crosslinked"): 0.68 wt. % in acrylate phase and 4.0 wt. % in SAN phases; and Sample E (control): commerical impact modifier KM-330 (Rohm & Haas).

Molding formulations using the above impact modifiers were prepared and tested in three separate moldings, as follows. (Knit line strength values are in ft-lb/in.)

| Formulation | SAMPLE | | | | |
| --- | --- | --- | --- | --- | --- |
| | A | B | C | D | E (control) |
| Lexan 140 | 100 | 100 | 100 | 100 | 100 |
| alkyl phenyl phosphite | 0.05 | 0.05 | 0.05 | 0.05 | 0.05 |
| Irganox 1076 | 0.1 | 0.1 | 0.1 | 0.1 | 0.1 |
| IMPACT MODIFIER | 5 | 5 | 5 | 5 | 5 |
| Molding #1 | | | | | |
| knit line strength | 5.9 | 26 | 9 | 29 | 36 |
| | all break | 4/5 break | all break | 3/5 break | 2/5 break |
| Molding #2 | | | | | |
| knit line strength | 24.3 | 31.4 | 29.7 | 35.6 | 32.3 |
| | hinge* | hinge | hinge | 1 nb* 3 hinge | nb |
| Molding #3 | | | | | |
| ⅛ in. IZOD | 13.6 | 12.7 | 12.8 | 13.6 | 13.9 |
| ⅛ in. IZOD | 15.4 | 15.2 | 14.7 | 15.5 | 15.0 |
| knit line strength | 24.1 | 33.2 | 29.1 | 33.9 | 43.6 |

*nb = no break; hinge = sample broke but pieces remained attached.

The swelling index for Samples A–D was also determined:

| Sample | Swelling index |
| --- | --- |
| A | 13.5 |
| B | 10.2 |
| C | 13.7 |
| D | 12.7 |

All of the aforementioned U.S. Patents are incorporated herein by reference.

It is to be understood that changes may be made in the particular embodiments of the invention described herein without departing from the full intended scope of the invention as defined by the appended claims.

What is claimed is:

1. An aromatic carbonate resin composition free of a non-crosslinked or linear styrene-acrylonitrile, exhibiting improved impact properties comprised of:
   (i) at least one thermoplastic aromatic carbonate resin; and
   (ii) an amount of at least one interpolymer of a crosslinked acrylate and a crosslinked styrene-acrylonitrile effective to improve the impact properties of said resin.

2. The composition of claim 1 wherein said crosslinked acrylate is comprised of the polymerized and crosslinked reaction products of at least one alkyl acrylate monomer, at least one alkyl methacrylate monomer, or mixtures thereof.

3. The composition of claim 2 wherein said alkyl acrylate monomer is selected from $C_2$–$C_{10}$ alkyl acrylate monomers.

4. The composition of claim 3 wherein said alkyl acrylate monomer is selected from $C_4$–$C_8$ alkyl acrylate monomer.

5. The composition of claim 4 wherein said alkyl acrylate monomer is butyl acrylate monomer.

6. The composition of claim 2 wherein said alkyl methacrylate monomer is selected from $C_8$–$C_{22}$ methacrylate monomers.

7. The composition of claim 1 wherein said crosslinked acrylate is highly crosslinked, said crosslinked styrene-acrylonitrile is highly crosslinked, or a combination thereof is highly crosslinked.

8. The composition of claim 7 wherein said crosslinked acrylate, said crosslinked styrene-acrylonitrile, or a combination thereof are prepared using a about 0.4 to 10 weight percent, based on the weight of the monomer, of a di- or poly-functional ethylenically unsaturated crosslinking agent.

9. The composition of claim 1 wherein said interpolymer is comprised of from about 40 to about 90 weight percent of said crosslinked acrylate and from 10 to about 60 weight percent of said crosslinked styrene-acrylonitrile.

10. The composition of claim 9 wherein said interpolymer is comprised of from about 50 to about 80 weight percent of said crosslinked acrylate and froma-about 20 to about 50 weight percent of said crosslinked styrene-acrylonitrile.

11. The composition of claim 10 wherein said crosslinked acrylate is comprised of the polymerized and crosslinked reaction products of at least one $C_4$–$C_8$ alkyl acrylate.

12. The composition of claim 11 wherein said alkyl acrylate is butyl acrylate.

13. The composition of claim 1 which contains from about 1 to about 30 weight percent of said interpolymer 14. The composition of claim 13 which contains from about 3 to about 25 weight percent of said interpolymer.

15. The composition of claim 14 which contains from about 4 to about 15 weight percent of said interpolymer.

16. The composition of claim 1 wherein said aromatic carbonate resin is a polycarbonate resin.

17. The composition of claim 1 wherein said aromatic carbonate resin is a copolyester-carbonate resin.

18. An aromatic carbonate resin composition exhibiting improved impact properties comprising:
   (i) at least one thermoplastic aromatic carbonate resin; and
   (ii) an amount effective to improve the impact properties of said resin of a two-phase interpolymer free of non-crosslinked or linear styrene-acrylonitrile comprised of a first phase of a crosslinked acrylate and a second phase of a crosslinked styrene-acrylonitrile, said first phase and said second phase being joined together by an interpenetrating network of said crosslinked acrylate and said crosslinked styrene-acrylonitrile.

19. The composition of claim 18 wherein said two-phase interpolymer is formed by a two-step polymerization process comprising first emulsion polymerizing at least one alkyl acrylate, alkyl methacrylate, or a mixture of at least one alkyl acrylate and at least one alkyl methacrylate in the presence of a crosslinking agent, and then emulsion polymerizing, in the presence of said crosslinked acrylate and a crosslinking agent, a styrene monomer and an acrylonitrile.

20. The composition of claim 19, wherein, in each step, from about 0.05 to about 10 weight percent of said crosslinking agent is employed.

21. The composition of claim 19, wherein said crosslinked acrylate phase, said styrene-acrylonitrile phase, or a combination thereof is highly crosslinked.

22. The composition of claim 21, wherein, in either emulsion polymerization step, at about 0.4 to 10 weight percent crosslinking agent, based on the weight of the monomer(s), is used.

23. The composition of claim 19 wherein said interpolymer is comprised of from about 40 to about 90 weight percent of said crosslinked acrylate and from about 10 to about 60 weight percent of said crosslinked styrene-acrylonitrile.

24. The composition of claim 23 wherein said interpolymer is comprised of from about 50 to about 80 weight percent of said crosslinked acrylate and from about 20 to about 50 weight percent of said crosslinked styrene-acrylonitrile.

25. The composition of claim 19 which contains from about 1 to about 30 weight percent of said interpolymer.

26. The composition of claim 25 which contains from about 3 to about 25 weight percent of said interpolymer.

27. The composition of claim 26 which contains from about 4 to about 15 weight percent of said interpolymer.

28. The composition of claim 19 wherein said alkyl acrylate is a $C_2$-$C_{10}$ alkyl acrylate.

29. The composition of claim 19 wherein said alkyl acrylate is a $C_4$-$C_8$ alkyl acrylate.

30. The composition of claim 29 wherein said alkyl acrylate is butyl acrylate.

31. The composition of claim 19 wherein said alkyl methacrylate is a $C_8$-$C_{22}$ alkyl methacrylate.

32. The composition of claim 18 wherein said aromatic carbonate resin is a polycarbonate resin.

33. The composition of claim 18 wherein said aromatic carbonate resin is a copolyester-carbonate resin.

34. A process for improving the impact properties of an aromatic carbonate resin comprising blending said aromatic carbonate resin with an amount effective to improve the impact properties thereof of a preferred two-phase interpolymer free of non-crosslinked linear styrene-acrylonitrile comprised of a crosslinked polyacrylate first phase comprised of the polymerized and crosslinked reaction products of at least one $C_2$-$C_{10}$ alkyl acrylate monomer, at least one $C_8$-$C_{22}$ alkyl methacrylate monomer, or mixtures thereof, and a crosslinked styrene-acrylonitrile second phase, said interpolymer being formed by a two-step polymerization process.

35. The process of claim 34 wherein said crosslinked polyacrylate is highly crosslinked, said crosslinked styrene-acrylonitrile is highly crosslinked, or a combination thereof is highly crosslinked.

36. The process of claim 35 wherein said crosslinked acrylate, said crosslinked styrene-acrylonitrile, or a combination thereof are prepared using about 0.4 to 10 weight percent, based on the weight of the monomer, of a di- or poly-functional ethylenically unsaturated crosslinking agent.

37. The process of claim 34 wherein said alkyl acrylate monomer is a $C_4$-$C_8$ alkyl acrylate.

38. The process of claim 34 wherein said alkyl acrylate monomer is butyl acrylate.

39. The process of claim 34 wherein said interpolymer is comprised of from about 40 to about 90 weight percent of said crosslinked polyacrylate first phase and from about 10 to about 60 weight percent of said crosslinked styrene-acrylonitrile second phase.

40. The process of claim 39 wherein said interpolymer is comprised of from about 50 to about 80 weight percent of said crosslinked polyacrylate first phase and from about 20 to about 50 weight percent of said crosslinked styrene-acrylonitrile second phase.

41. The process of claim 34 which comprises blending from about 1 to about 30 weight percent of said interpolymer with said resin.

42. The process of claim 40 which comprises blending from about 3 to about 25 weight percent of said interpolymer with said resin.

43. The process of claim 42 which comprises blending from about 4 to about 15 weight percent of said interpolymer with said resin.

44. The process of claim 34 wherein said aromatic carbonate resin is a polycarbonate resin.

45. The process of claim 34 wherein said aromatic carbonate resin is a copolyester-carbonate resin.

* * * * *